US010037040B2

(12) United States Patent
Hervieux et al.

(10) Patent No.: US 10,037,040 B2
(45) Date of Patent: Jul. 31, 2018

(54) STABILITY AND CONTROL AUGMENTATION SYSTEM

(71) Applicant: Goodrich Actuation Systems SAS, Buc (FR)

(72) Inventors: Arnauld R. E. Hervieux, Versailles (FR); Gregory Y. Meignat, Versailles (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 433 days.

(21) Appl. No.: 14/632,044

(22) Filed: Feb. 26, 2015

(65) Prior Publication Data
US 2015/0239551 A1 Aug. 27, 2015

(30) Foreign Application Priority Data
Feb. 27, 2014 (EP) .................................. 14305276

(51) Int. Cl.
*G05D 1/00* (2006.01)
*G05D 1/08* (2006.01)
(Continued)

(52) U.S. Cl.
CPC ........... *G05D 1/0816* (2013.01); *B64C 13/18* (2013.01); *B64C 13/42* (2013.01); *B64C 13/44* (2013.01);
(Continued)

(58) Field of Classification Search
CPC ......... B64C 13/00; B64C 13/18; B64C 13/42; B64C 13/44; G05D 1/00; G05D 1/0816
See application file for complete search history.

(56) References Cited

U.S. PATENT DOCUMENTS 3,679,956 A * 7/1972 Redmond ............... B64C 13/00
318/13
3,945,590 A * 3/1976 Kennedy, Jr. ........ G05D 1/0661
244/181
(Continued)

FOREIGN PATENT DOCUMENTS

EP 2574797 A3 4/2013
EP 2947531 A1 * 11/2015 ........... G05D 1/0833
(Continued)

OTHER PUBLICATIONS

European Search Report for Application No. 14305276.7-1754, dated Jul. 28, 2014, 5 pages.
(Continued)

*Primary Examiner* — Tien Q Dinh
*Assistant Examiner* — Aaron M Rodziwicz
(74) *Attorney, Agent, or Firm* — Cantor Colburn LLP

(57) ABSTRACT

A Stability and Command Augmentation System (SCAS) for an aircraft, the SCAS including, a first input shaft providing a first rotational input; a second input shaft providing a second rotational input; and a device for summing the first and second rotational inputs to give a rotational output for controlling an actuator. A method of operating a SCAS on an aircraft, the method including providing a pilot input order in the form of a rotating first shaft, providing an augmentation input order in the form of a rotating second shaft, summing the rotation of the pilot input order and the augmentation input order to give an output order; and using the output order to control an actuator.

9 Claims, 4 Drawing Sheets

(51) Int. Cl.
*G05G 11/00* (2006.01)
*B64C 13/42* (2006.01)
*B64C 13/18* (2006.01)
*B64C 13/44* (2006.01)

(52) U.S. Cl.
CPC ......... *G05G 11/00* (2013.01); *Y10T 74/20207* (2015.01); *Y10T 74/20366* (2015.01)

(56) References Cited

U.S. PATENT DOCUMENTS

| | | | | |
|---|---|---|---|---|
| 4,094,479 A | * | 6/1978 | Kennedy, Jr. ........ | G05D 1/0816 244/179 |
| 4,441,675 A | * | 4/1984 | Boehringer ............ | B64C 13/24 244/194 |
| 4,533,097 A | * | 8/1985 | Aldrich ................. | B64C 13/42 244/76 R |
| 4,992,713 A | * | 2/1991 | McCollum .......... | G05D 1/0808 244/17.13 |
| 5,170,969 A | * | 12/1992 | Lin ...................... | G05D 1/0808 244/175 |
| 6,352,223 B1 | * | 3/2002 | Larramendy ........ | G05D 1/0808 244/177 |
| 2013/0249444 A1 | * | 9/2013 | Golding ................ | F16H 37/065 318/8 |

FOREIGN PATENT DOCUMENTS

| | | |
|---|---|---|
| RU | 2312794 C2 | 1/2006 |
| RU | 2277195 C2 | 5/2006 |
| WO | 8702106 A1 | 4/1987 |

OTHER PUBLICATIONS

Russian Examination Report for International Application No. 2015106014/11(009650), dated Jul. 19, 2016, 7 pages.

* cited by examiner

STABILITY AND CONTROL AUGMENTATION SYSTEM

FOREIGN PRIORITY

This application claims priority to European Patent Application No. 14305276.9 filed Feb. 27, 2014, the entire contents of which is incorporated herein by reference.

TECHNICAL FIELD

The present disclosure relates to a Stability and Command Augmentation System (SCAS) for an aircraft, such as an aeroplane or a helicopter.

BACKGROUND

A SCAS is used to superimpose an order generated by the flight computer (i.e. the "autopilot") onto a manual input (e.g. a pilot input). The SCAS comprises an actuator that provides an output for controlling a flight-control surface, such as a yaw rudder.

Traditionally, SCAS actuators comprise an assembly including a solenoid valve, an electro-hydraulic servo valve, a position sensor (such as a Linear Variable Differential Transformer (LVDT)) and an output piston.

This prior art system can however be complicated, expensive and prone to leakages due to the presence of the hydraulics in the servo valve.

The present disclosure seeks to address at least some of these issues.

SUMMARY

There is disclosed herein a SCAS for an aircraft, the SCAS comprising a first input shaft providing a first rotational input, a second input shaft providing a second rotational input and a device for summing the first and second rotational inputs to give a rotational output for controlling an actuator.

The SCAS may control an actuator that controls any portion of an aircraft, such as a flight control surface.

The summing device may be any device that can combine the rotation of the first and second input shafts and provide an augmented rotational output.

In one embodiment, the summing device sums the two rotational inputs algebraically, so that a first negative input and a second positive input will at least partially cancel each other out.

The first and second rotational inputs may be provided on the first and second input shafts respectively by any suitable input devices. In one embodiment, the SCAS may further comprise a pilot input device arranged to provide and/or control the rotation of the first input shaft and a flight computer arranged to provide and/or control the rotation of the second input shaft.

The term 'pilot input device' should be understood to mean any device that the pilot can operate to directly or indirectly rotate the first input shaft. The pilot input device may be a mechanical device that is connected to the first input shaft via a purely mechanical linkage. Alternatively, the pilot input device may comprise a device that provides an electronic or electric signal that controls an electromechanical actuator that rotates the first input shaft.

The term 'flight computer' should be understood to mean any computer that controls some aspect of the aircraft, for example an 'autopilot'. The flight computer may monitor flight conditions and send signals to one or more actuators to modify flight control surfaces, e.g. yaw rudders.

In one embodiment, the SCAS may further comprise an electric motor arranged to rotate the second input shaft. The electrical motor may thus be arranged to control rotation of the second input shaft in response to a command from the flight computer.

The electric motor may be configured to control the angular displacement of the second input shaft incrementally, so that the flight computer can command the motor to rotate the second input shaft a certain angular displacement. For example, a stepper motor could be used.

Alternatively or additionally, a position sensor could be provided so that the angular displacement of the second input shaft could be determined at any time, and, for example, fed back to the flight computer. For example, a rotary variable differential transformer (RVDT) could be used in conjunction with a torque motor.

In one embodiment, the device comprises a planetary gear assembly comprising a ring gear, a sun gear and a plurality of planet gears. Each planet gear (also known in the art as a 'satellite gear') is driveably connected to both the ring gear and the sun gear. The sun gear is positioned within and co-axial with the ring gear. The ring gear and sun gear can rotate relative to each other.

The term 'driveably connected' should be understood to mean that the planet gears may directly drive the ring gear and the sun gear, or there may be one or more intermediate members that transmit the motion between the planet gear and the ring gear or sun gear or vice versa.

There may be any suitable number of planet gears. For example, two, three or four planet gears may be used.

The planet gears may be secured to each other so that they can still move around the ring and sun gears and rotate about their own axes, for example by using a planet carrier having an arm connected to each planet gear. Alternatively, the planet gears may not be secured to each other and may just be held in position by virtue of being engaged with the ring and sun gears.

The planet gears may engage an inner surface of the ring gear. In particular, the planet gears may engage a row of teeth formed on the inner circumferential surface of the ring gear.

The second input shaft may be driveably connected with the ring gear, in particular, the outer surface of the ring gear. The second input shaft may engage a row of teeth formed on the outer circumferential surface of the ring gear.

The sun gear may be driveably connected to the first input shaft. For example, the sun gear may be formed on (i.e. integral with) the first input shaft or may be separately formed and connected to the first input shaft in such a way that it is rotationally driven thereby.

The planet gears may provide the rotational output for controlling an actuator. In other words, the rotation of the planet gears may be used as a means for controlling an actuator. For example, a circular gear (having teeth along its circumference) may be driveably connected to both an actuator and the planet gears. The circular gear may be positioned between the planet gears. The circular gear may be rotatable about the same axis as the ring gear and the sun gear.

Driving the sun gear in a first rotational direction may cause the planet gears to travel around the inner surface of the ring gear (i.e. about a central axis of the planet gear assembly), in the same (first) rotational direction, rotating about their own axes as they travel around the ring gear.

Driving the ring gear in an opposite second rotational direction may also cause the planet gears to travel around the outer surface of the sun gear (again about a central axis of the planet gear assembly), in the first rotational direction, rotating about their own axes as they travel.

The rotation of the planet gears around both their own axes and the central axis of the planet gear assembly combines to produce a rotational output of a gear positioned with the planet gears. As such, driving the planet gear and the ring gear in opposite directions causes the rotation of these gears to be added together, so that the planet gears rotate further. Driving the planet gear and the ring gear in the same direction means that the smaller amount of rotation of these gears is subtracted from the other and the planet gears' rotation is reduced. As such, by monitoring the magnitude of the pilot input order, the SCAS can provide an appropriate augmentation input order (via the second input shaft) to supply any desired magnitude of rotation to an actuator.

The SCAS may further comprise a housing surrounding at least a portion of the planetary gear assembly and a centering mechanism for biasing the planetary gear assembly towards a predetermined position in relation to the housing. The housing may hold the planet gear and the ring gear in a co-axial arrangement.

The centering mechanism may be arranged to return the ring gear to the predetermined position if the motor fails and the second input shaft becomes free to rotate.

The centering mechanism may comprise a member that extends into a concave portion (i.e. an indentation) in the ring gear and/or the housing.

The centering mechanism may comprise a resilient member positioned between the ring gear and the housing.

The resilient member may or may not be secured to the ring gear and/or the housing.

In the predetermined position of the ring gear, the resilient member may be in an unstressed or unextended position. Rotation of the ring gear away (relative to the housing) away from the predetermined position may place the resilient member in tension and/or in a stressed condition. As such, rotation of the ring gear (relative to the housing) away from the predetermined position may be resisted by the resilient member.

The resilient member may comprise a tension spring.

Movement of the ring gear away from the predetermined position may extend the tension spring away from its normal length (when the ring gear is in the predetermined position).

The SCAS may further comprise an actuator driveably connected to the rotational output of the summing device. The actuator may be used to control one or more flight surfaces. The actuator may comprise a rotational input that is driveably connected to the rotational output of the summing device, for example the planet gears. The rotational input of the actuator, such as a gear, may be arranged to rotate about the same axis as the first input shaft and may be positioned between the planet gears.

Also disclosed is a method of controlling an actuator, the method comprising using the SCAS described above.

Also disclosed herein is a method of operating a SCAS on an aircraft, the method comprising providing a pilot input order in the form of a rotating first shaft, providing an augmentation input order in the form of a rotating second shaft, summing the rotation of the pilot input order and the augmentation input order to give an output order and using the output order to control an actuator.

The step of providing a pilot input order may comprise operating a pilot input device to rotate the first shaft.

The step of providing an augmentation input order may comprise a flight control computer (e.g. an autopilot) sending a command that causes the second shaft to rotate, for example to an electric motor.

The step of summing the rotation of the pilot input order and the augmentation input order may comprise using a planetary gear assembly.

The step of using the output order to control an actuator may comprise rotating an input shaft of an actuator.

The method of operating a SCAS may comprise the step of using a SCAS as described above, wherein the rotating first shaft comprises the first input shaft, the rotating second shaft comprises the second input shaft and the step of summing the rotation of the pilot and augmentation orders comprises using the summing device.

The output order may be in the form of one or more rotating output shafts that drive an input shaft of the actuator. The input shaft of the actuator may comprise (or be driveably connected to) a gear that directly or indirectly engages the output shafts, for example, the planet gears.

BRIEF DESCRIPTION OF THE DRAWINGS

Some exemplary embodiments of the present disclosure will now be described by way of example only and with reference to FIGS. 1 to 4, of which.

DETAILED DESCRIPTION

Figure 1:
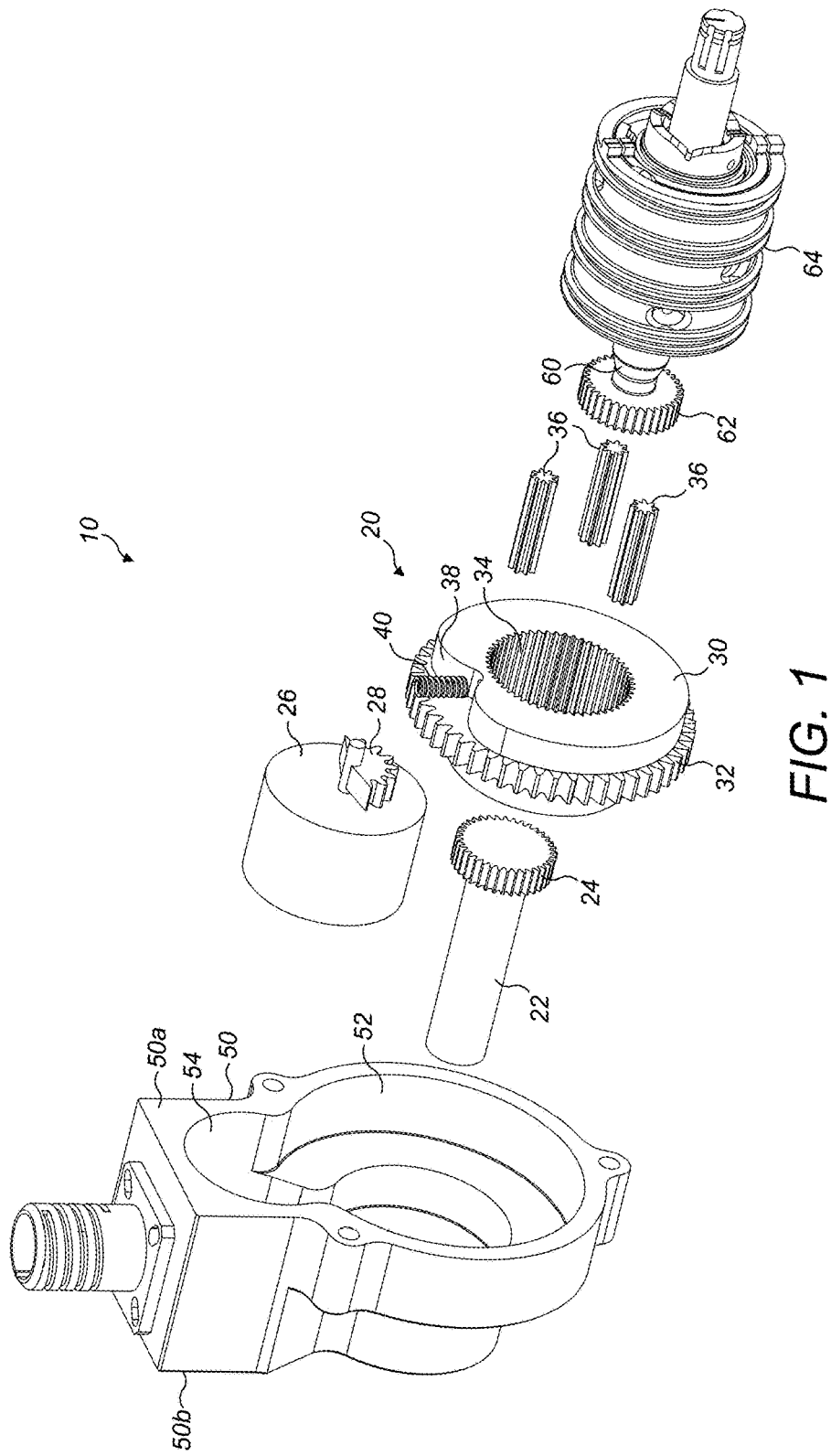
FIG. 1 shows an exploded three-dimensional view of a SCAS according to one embodiment of the present disclosure.
Figure 2:
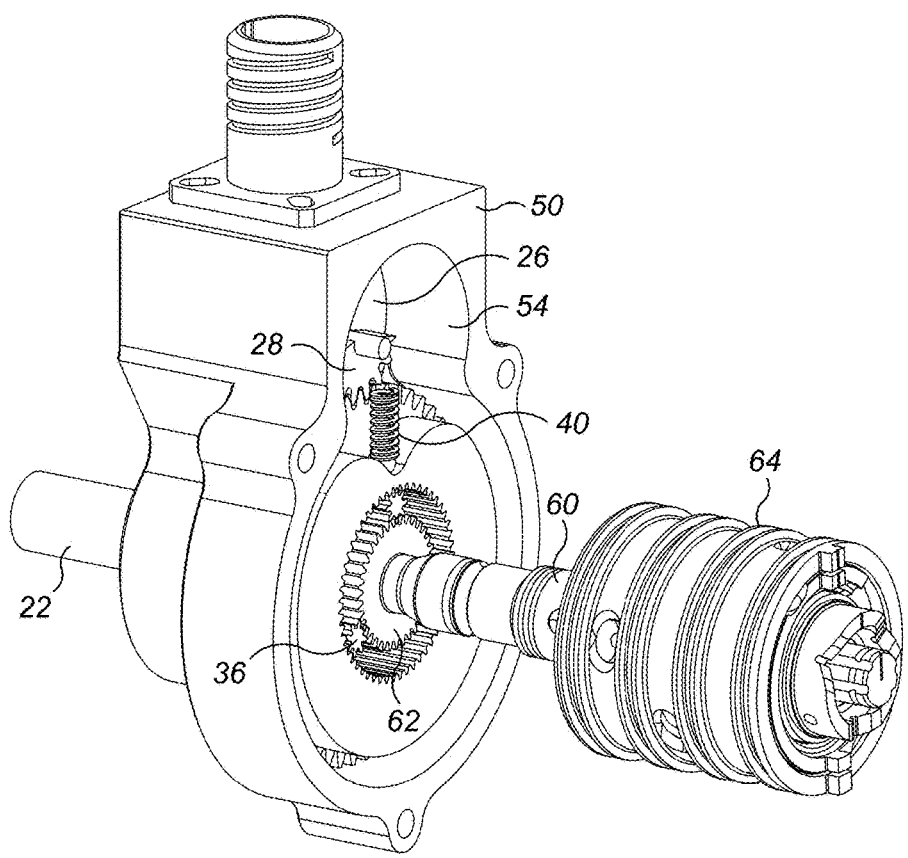
FIG. 2 shows an assembled three-dimensional view of the SCAS of FIG. 1.
Figure 3:
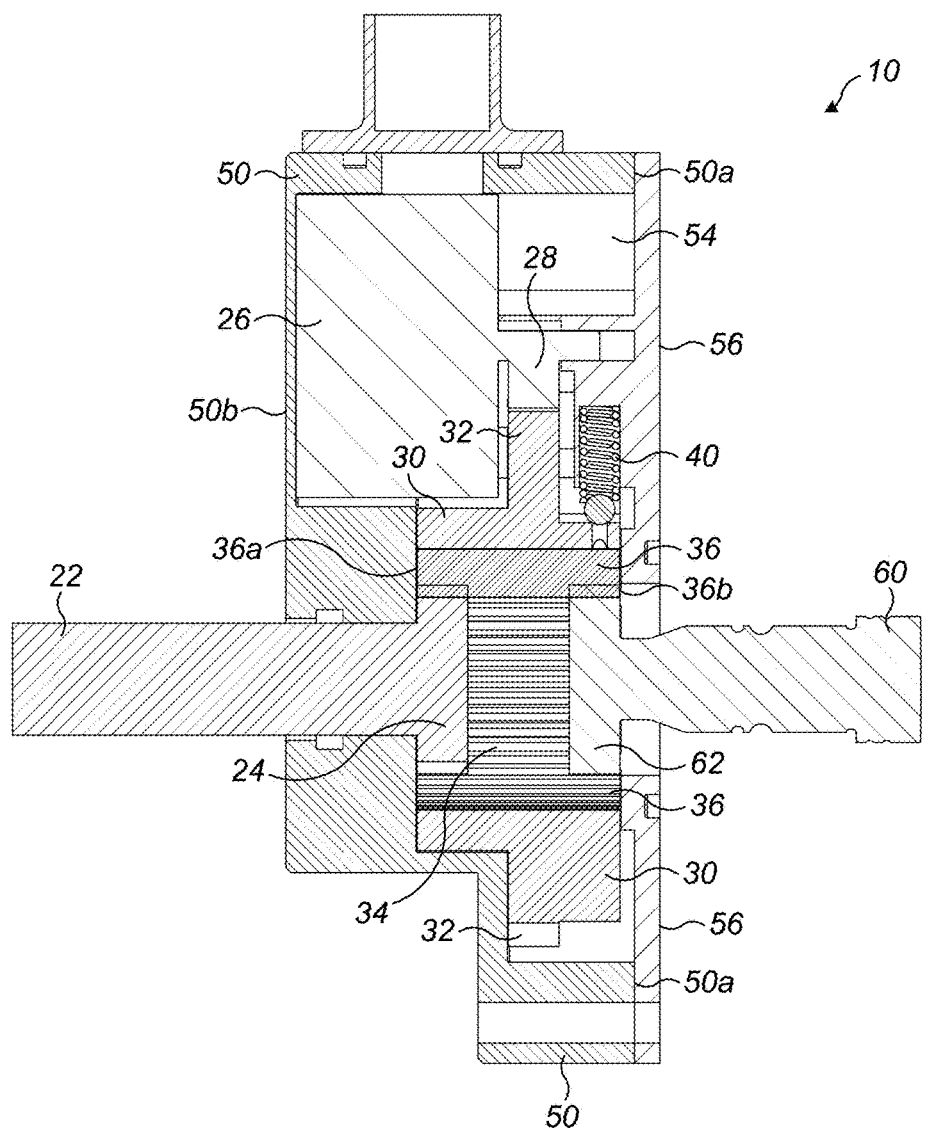
FIG. 3 shows a cross-sectional view, taken in the axial direction, of the assembled SCAS of FIG. 2.

FIGS. 1 to 3 show parts of a SCAS 10. It should be understood, however, that a SCAS also contains other parts not shown in these figures, such as one or more actuators, the flight computer, electric and mechanical linkages and the pilot input device.

The SCAS 10 comprises a planet gear assembly 20 having a first input shaft 22, a second input shaft 28, a ring gear 30 and three planet gears 36. Also provided is a gear 62 for controlling an actuator (not shown).

The first input shaft 22 is driveably connected to a pilot input device (not shown) located in the cockpit of the aircraft. The first input shaft 22 can therefore be considered to be a pilot input shaft. The first input shaft 22 comprises a sun gear 24. The sun gear 24 may integrally formed on the first input shaft 22 or secured thereto in any suitable manner.

The second input shaft 28 is connected to an electric motor 26. The motor 26 may be, for example, a stepper motor, so that the angular displacement of the shaft 28 can be incrementally controlled, or a torque motor used with a RVDT, so that the angular displacement of the second input shaft 28 can be closely monitored (by the flight control computer).

The electric motor 26 is driveably connected to a flight control computer, for example an autopilot (not shown). The second input shaft 28 may therefore be considered to be a flight computer input order, an autopilot input order or an augmentation input order.

The ring gear 30 comprises external teeth 32 arranged along its outer circumference and internal teeth 34 arranged along its inner circumference. The external teeth 32 are configured to engage the teeth of the second input shaft 28. The internal teeth 34 are configured to engage the teeth of the three planet gears 36, which are positioned between the ring gear 30 and the sun gear 24. The teeth of the sun gear 24 are thus configured to engage the teeth of the planet gears 36.

The teeth of the planet gears 36 are also configured to engage the teeth of the gear 62. The gear 62 is connected to (or formed on) an input shaft 62 for a control valve 64. The control valve 64 rotates, together with the gear 62 and the input shaft 62, to control hydraulic flow within actuator chambers (not shown), which, in turn, controls the actuation of an actuator (not shown).

As can be seen in FIG. 3, the planet gears 36 each have a first end 36a and a second end 36b. The first end 36a engages the sun gear 24 while the second end 36b engages the gear 62. There is a gap, along the length of the planet gear 36, between the end of the sun gear 24 and the opposing end of the gear 62.

A housing 50 is provided into which the planet gear assembly 20 is positioned. The housing 50 comprises a first face 50a and a second face 50b. The second face 50b is generally planar and has an aperture through which the first input shaft 22 passes. The first face 50a has a first aperture 52 that receives the ring gear 20 and a second, smaller aperture 54 (connected to the first aperture 52) that receives the electric motor 26. As shown in FIG. 3, a cover plate 56 can be secured to the first face 50a once the planet gear assembly 20 is in place. The cover plate 56 has an aperture through which the control valve input shaft 62 passes.

Secured to the ring gear 30 is a centering mechanism in the form of a tension spring 40. The tension spring 40 sits in a concave portion 38, i.e. an indentation, on the ring gear 30, and extends into the second aperture 54 in the housing first face 50a. The tension spring 40 may be secured to a portion of the second input shaft 28.

Figure 4:
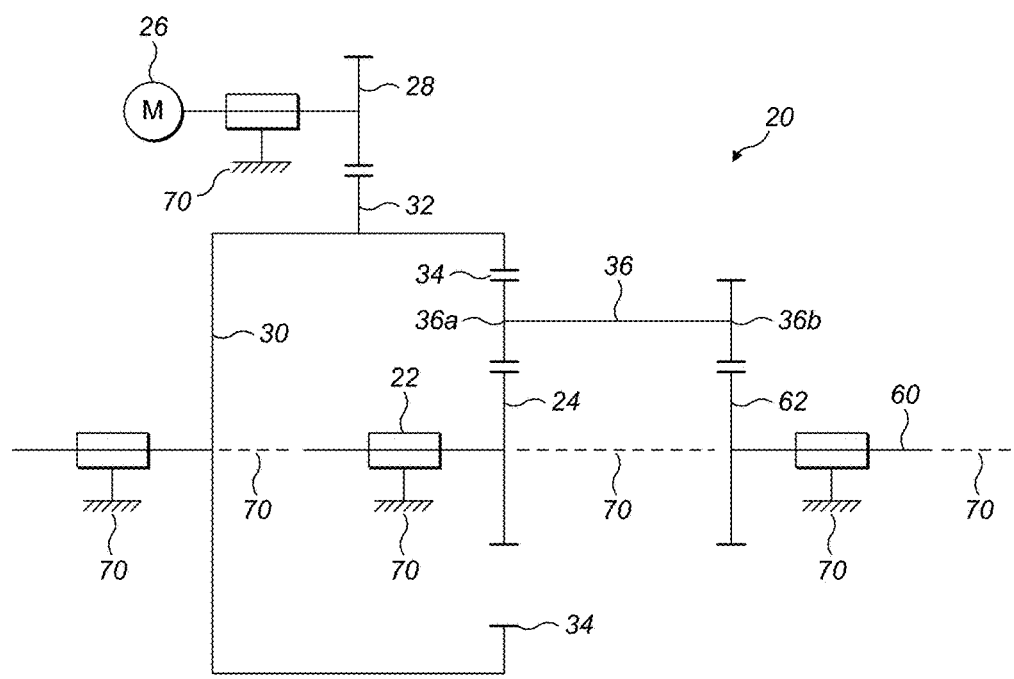
FIG. 4 shows a schematic functional view of the SCAS of FIGS. 1 to 3.

FIG. 4 shows a schematic functional plan of the planet gear assembly 20. Electric motor 26, ring gear 30, first input shaft 22 and control valve input shaft 60 are each shown and are each secured to a ground 70 in such a way that they can rotate relative thereto. A single planet gear 36 is shown in engagement with internal teeth 34 of ring gear 30 and gear 24 of first input shaft 22. As can be seen, the first input shaft 22 and the control valve input shaft 60 are aligned along planet gear assembly axial centerline 70, about which these shafts 22, 60 as well as ring gear 30 and planet gears 36 rotate.

In use, a pilot will operate the pilot input device (not shown), which will cause the first input shaft 22 and sun gear 24 to rotate.

This rotation will be imparted to the three planet gears 36 which engage the sun gear 24. Due to the weight of the ring gear 30 and the kinematics of the system, the three planet gears 36 will move with the sun gear 24 around the internal circumference of the ring gear 30 as they are engaged with internal teeth 34. As they move around the ring gear 30, the planet gears 36 will rotate about their own axes. The movement of the planet gears 36 around the ring gear 30 and around their own axes causes the input gear 62 of the control valve 64 to rotate. This will, in turn, actuate the actuator (not shown) to, for example, vary a flight control surface, such as a yaw rudder. The operation of the pilot input device thus operates the actuator.

If the flight control computer determines that the command from the pilot input device needs to be augmented, for example, by increasing the extent to which the actuator varies the flight control surface, the computer sends a command to the electric motor 26 to rotate the second input shaft 28 one direction or another by a certain angular displacement.

Rotating the second input shaft 28 causes the ring gear 30 to rotate, which, in turn, causes the three planet gears 36 to move, with the ring gear 30, around the sun gear 24. Again, each planet gear 36 will also rotate about their own axes as it travels around the sun gear 24. This will cause the input gear 62 to rotate.

When both the first input shaft 22 and the second input shaft 28 are rotated, their rotation will be summed algebraically, i.e. if both rotations are 'positive', the rotations will be added together, but if one rotation is 'negative', then that rotation will be subtracted from the other 'positive' rotation.

It should be understood, however, that in order to increase the rotation of the input gear 62, (to more than that cause by the first input shaft 22), the electric motor 26 must rotate the second input shaft 28 in the opposite direction to the first input shaft 22. This is because rotating the first input shaft 22 and second input shaft 28 in opposite directions causes the three planet gears 36 to rotate in the same direction. As such, if the flight control computer determines that too much rotation has been imparted to the input gear 62 (and thus the actuator) by the pilot input device, this rotation could be reduced by rotating the second input shaft 28 in the same direction as the first input shaft 22 is being rotated. Varying the rotation of the first input shaft 22 and the second input shaft 28 changes the amount the three planet gears 36 rotate the input gear 62.

The tension spring 40 biases the ring gear 30 (relative to the housing 50) to the normal position shown in FIGS. 1 to 3, where the spring 40 is vertical. This prevents the ring gear 30 rotating freely should the motor 26 fail. The spring 40 thus acts as a safety mechanism.

The invention claimed is:

1. A Stability and Command Augmentation System (SCAS) for an aircraft, the SCAS comprising:
    a first input shaft providing a first rotational input;
    a second input shaft providing a second rotational input;
    a device for summing the first and second rotational inputs to give a rotational output for controlling an actuator, wherein the device comprises a planetary gear assembly comprising a ring gear, a sun gear and a plurality of planet gears, wherein each planet gear is driveably connected to both the ring gear and the sun gear;
    a housing surrounding at least a portion of the planetary gear assembly; and
    a centering mechanism for biasing the planetary gear assembly towards a predetermined position in relation to the housing, wherein the centering mechanism comprises a tension spring positioned between the ring gear and the housing.

2. The SCAS of claim 1, further comprising at least one of:
    a pilot input device arranged to control the rotation of the first input shaft; or
    a flight computer arranged to control the rotation of the second input shaft.

3. The SCAS of claim 1, further comprising an electric motor arranged to rotate the second input shaft.

4. The SCAS of claim 3, wherein an angular displacement of the second input shaft is at least one of:
    incrementally controlled by the electric motor; or
    determined by a position sensor.

5. The SCAS of claim 1, wherein the second input shaft is driveably connected to the ring gear.

6. The SCAS of claim 1, wherein the first input shaft is driveably connected to the sun gear.

7. The SCAS of claim 6, wherein the planet gears provide the rotational output for controlling an actuator.

8. The SCAS of claim 1, further comprising an actuator driveably connected to the rotational output of the summing device.

9. A method of controlling an actuator, the method comprising using a SCAS as claimed in claim 1.

* * * * *